(12) United States Patent
Alshammari et al.

(10) Patent No.: US 12,391,567 B1
(45) Date of Patent: Aug. 19, 2025

(54) EXTRACTION OF ALKALINE EARTH METAL HYDROXIDES FROM PRODUCED OILFIELD BRINE

(71) Applicant: Saudi Arabian Oil Company, Dhahran (SA)

(72) Inventors: Salem Alshammari, Dhahran (SA); Hussain Habib Al Saleem, Al Qatif (SA); Salah Hamad Al-Saleh, Dhahran (SA); Subhash Ayirala, Dhahran (SA); Ali Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/760,892

(22) Filed: Jul. 1, 2024

(51) Int. Cl.
| | |
|---|---|
| *C01F 11/02* | (2006.01) |
| *C01F 5/14* | (2006.01) |
| *C01F 5/24* | (2006.01) |
| *C01F 11/18* | (2006.01) |

(52) U.S. Cl.
CPC .............. *C01F 11/182* (2013.01); *C01F 5/14* (2013.01); *C01F 5/24* (2013.01); *C01F 11/02* (2013.01)

(58) Field of Classification Search
CPC ......... C01F 11/182; C01F 11/02; C01F 11/00; C01F 5/14; C01F 5/24
See application file for complete search history.

(56) References Cited

U.S. PATENT DOCUMENTS 4,500,500 A    2/1985 Paalman et al.

OTHER PUBLICATIONS

Ayoub et al., "Treating Produced Water From an Oil Reservoir for Re-Injection and Enhanced Oil Recovery," Platform—A Journal of Engineering, Science and Society, Jun. 2013, 9(1):43-52, 11 pages.
Doran et al., "Pilot study results to convert oil field produced water to drinking water or reuse," SPE 49124, Paper presented at the SPE Annual Technical Conference and Exhibition, New Orleans, Louisiana, United States, Sep. 27-30, 1998, 15 pages.
Druckenmiller et al., "Carbon sequestration using brine of adjusted pH to form mineral carbonates," Fuel Processing Technology, Oct. 2005, 86(14-15):1599-1614, 16 pages.
Jan et al., "A new caustic process for softening produced water for steam generation," SPE-19759-PA, SPE Production Engineering, May 1, 1992, 7(2):199-202, 4 pages.
La Plante et al., "Saline Water-Based Mineralization Pathway for Gigatonne-Scale $CO_2$ Management," ACS Sustainable Chemistry & Engineering 2021 9(3):1073-1089, 17 pages.
Montes-Hernandez et al., "Rhombohedral calcite precipitation from $CO_2$—$H_2O$—$Ca(OH)_2$ slurry under supercritical and gas $CO_2$ media," Journal of Crystal Growth, 2007, 308, 26 pages.

(Continued)

*Primary Examiner* — Smita S Patel
(74) *Attorney, Agent, or Firm* — Fish & Richardson P.C.

(57) ABSTRACT

Method of producing hydroxides for use in carbon dioxide mineralization, the method including adding a first amount of sodium hydroxide to a produced oilfield brine to precipitate $Mg(OH)_2$, adding a second amount of sodium hydroxide to precipitate $Ca(OH)_2$, filtering the precipitates, and adding an amount of the filtered precipitates to an aqueous carbon dioxide solution.

8 Claims, 3 Drawing Sheets

(56) References Cited

OTHER PUBLICATIONS

Ochonma et al., "Tuning Reactive Crystallization Pathways for Integrated $CO_2$ Capture, Conversion, and Storage via Mineralization," Accounts of Chemical Research, Jan. 16, 2024, 57(3):267-274, 8 pages.

Parkhurst et al., "Description of input and examples for PHREEQC version 3—a computer program for speciation, batch-reaction, one-dimensional transport, and inverse geochemical calculations," US Geological Survey Techniques and Methods, 2013, 6(A43), 519 pages.

Sheng, "Investigation of alkaline-crude oil reaction," Petroleum, Mar. 2015, 1(1):31-39, 9 pages.

Soong et al., "Experimental and simulation studies on mineral trapping of $CO_2$ with brine," Energy Conversion and Management, Jul. 2004, 45(11-12):1845-1859, 15 pages.

Tomar, "Evaluation of Chemicals to Control the Generation of Malodorous Hydrogen-Sulfide in Wastewater," Water Research, Dec. 1994, 28(12):2545-2552, 8 pages.

Vassallo et al., "A pilot-plant for the selective recovery of magnesium and calcium from waste brines," Desalination, Dec. 2021, 517, 115231, 13 pages.

Wang et al., "$CO_2$ Fixation in $Ca^{2+}$-/$Mg^{2+}$-Rich Aqueous Solutions through Enhanced Carbonate Precipitation," Industrial & Engineering Chemistry Research, May 19, 2011, 50(13):8333-8339, 7 pages.

Wenzlick et al., "Techno-economic analysis of converting oil and gas produced water into valuable resources," Desalination, May 2020, 481, 27 pages.

Xiao, "Characterization and treatment of Bakken oilfield produced water as a potential source of value-added elements," Science of the Total Environment, May 20, 2021, 770, 145283, 8 pages.

EXTRACTION OF ALKALINE EARTH METAL HYDROXIDES FROM PRODUCED OILFIELD BRINE

TECHNICAL FIELD

This document relates to methods and system used in extracting alkaline earth metals from produced oilfield brine, and methods and systems of using the extracted alkaline earth metals in $CO_2$ mineralization.

BACKGROUND

Produced oilfield brine is hypersaline and also rich in divalent cations such as calcium and magnesium. Effective utilization, recycling, and the use of produced water in carbon capture remains an ongoing area of investigation.

SUMMARY

This disclosure describes methods and systems used in extracting alkaline earth metals from produced oilfield brine, and methods and systems of using the extracted alkaline earth metals in $CO_2$ mineralization.

In some embodiments, a method of producing hydroxides for use in carbon dioxide mineralization includes adding a first amount of sodium hydroxide (NaOH) to a produced oilfield brine, wherein the produced oilfield brine comprises magnesium and calcium ions, to yield a first treated brine, wherein the first treated brine comprises $Mg(OH)_2$ precipitates, filtering the $Mg(OH)_2$ precipitates from the first treated brine to yield a filtered treated brine, adding a second amount of NaOH to the filtered treated brine to yield a second treated brine, wherein the second treated brine comprises $Ca(OH)_2$ precipitates, filtering the $Ca(OH)_2$ precipitates from the second treated brine to yield a softened water, and adding an amount of the filtered $Mg(OH)_2$ precipitates, an amount of the filtered $Ca(OH)_2$ precipitates, or a combination thereof to a solution comprising aqueous carbon dioxide to yield carbonate precipitates.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure are methods and systems used in extracting alkaline earth metals from produced oilfield brine, and methods and systems of using the extracted alkaline earth metals in $CO_2$ mineralization.

Magnesium and calcium ions are divalent ions. When sodium hydroxide (NaOH) is added to a solution that includes magnesium ions and calcium ions, the magnesium ions are more reactive than the calcium ions. The reactions of magnesium ions and calcium ions with hydroxide ions are shown in equations 1 and 2.

$$Mg_{(aq)}^{2+} + 2OH_{(aq)}^- \leftrightarrow Mg(OH)_{2(s)} \qquad \text{Eq. 1}$$

$$Ca_{(aq)}^{2+} + 2OH_{(aq)}^- \leftrightarrow Ca(OH)_{2(s)} \qquad \text{Eq. 2}$$

Figure 1:
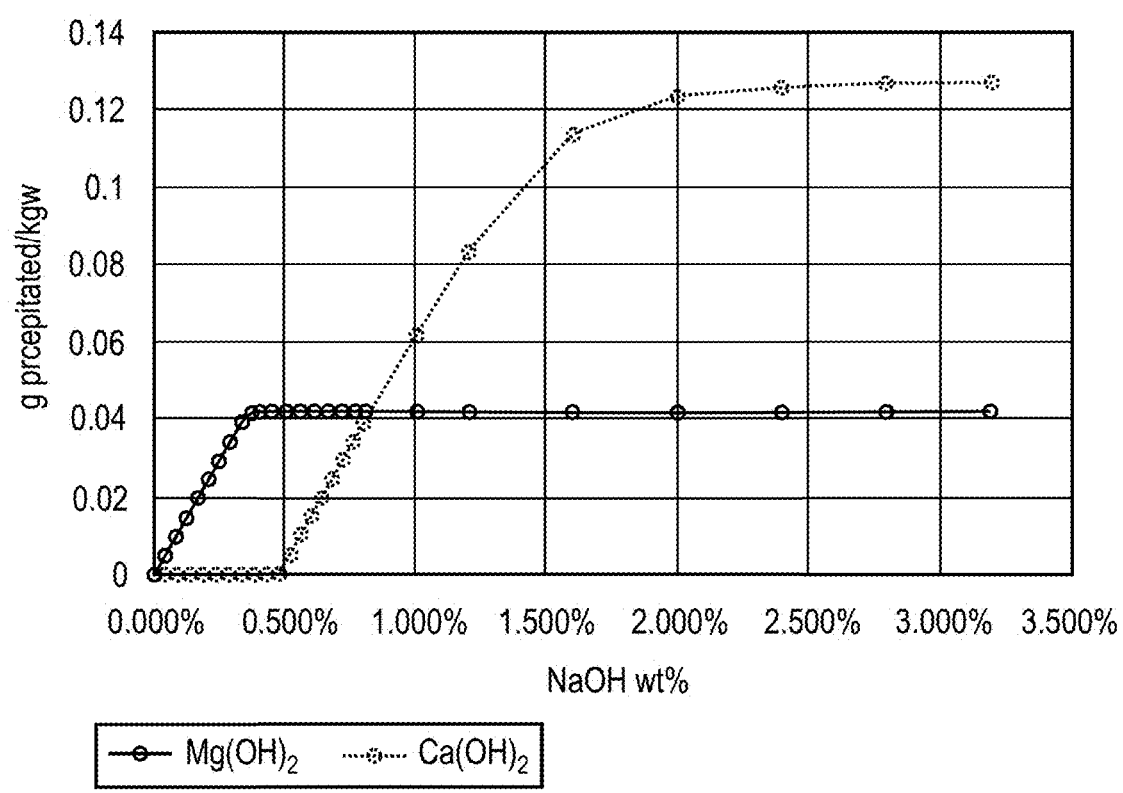
FIG. 1 shows an example PREEQC model of $Mg(OH)_2$ and $Ca(OH)_2$ precipitation as a function of NaOH wt %.

The equilibrium constant for reaction 1 is higher than reaction 2 and therefore thermodynamically more favorable. This difference in reactivity can be exploited to selectively extract first $Mg(OH)_2$ followed by $Ca(OH)_2$. This process has a high selectivity, ensuring that the extracted salts have a high purity. FIG. 1 shows an example PREEQC model of $Mg(OH)_2$ and $Ca(OH)_2$ precipitation as a function of NaOH wt %. As shown in FIG. 1, initially $Mg(OH)_2$ is precipitated exclusively. As the amount of NaOH increases, $Ca(OH)_2$ begins to precipitate. Accordingly, $Mg(OH)_2$ and $Ca(OH)_2$ can be selectively precipitated and selectively removed from a solution by controlling the amount of NaOH in a solution. The precipitated hydroxides can be sold or used in subsequent industrial processes. For example, $Mg(OH)_2$ has a higher commercial value than $MgCO_3$. Accordingly, the $Mg(OH)_2$ can be sold rather than used in subsequent processes, such as carbon dioxide mineralization.

In some embodiments, $Mg(OH)_2$ and $Ca(OH)_2$ are selectively extracted from produced oilfield brine as a function of hydroxide concentration. The extracted $Mg(OH)_2$ and $Ca(OH)_2$ can be used to mineralize $CO_2$. $CO_2$ mineralization is a process by which dissolved $CO_2$ is precipitated as a carbonate. At low pH, dissolved $CO_2$ is hydrated to carbonic acid, as shown in Equation 3. Addition of a base can deprotonate the carbonic acid to form carbonate, as shown in Equation 4. The carbonate in a solution can react with calcium ions, as shown in Equation 5, or with magnesium ions, as shown in Equation 6. The calcium and magnesium ions produced by precipitation with NaOH can be used as both a hydroxide source to raise the pH of the solution and a source of calcium and magnesium ions. This represents a cost-efficient way to produce the reactants for a carbon dioxide mineralization process.

$$CO_{2(aq)} + H_2O \leftrightarrow H_2CO_{3(aq)} \qquad \text{Eq. 3}$$

$$H_2CO_{3(aq)} + 2OH^- \leftrightarrow CO_{3(aq)}^{2-} \qquad \text{Eq. 4}$$

$$Ca^{2+} + CO_{3(aq)}^{2-} \leftrightarrow CaCO_{3(s)} \qquad \text{Eq. 5}$$

$$Mg^{2+} + CO_{3(aq)}^{2-} \leftrightarrow MgCO_{3(s)} \qquad \text{Eq. 6}$$

The resulting calcium carbonate and/or magnesium carbonate sequesters $CO_2$ that might otherwise have been released into the atmosphere or be present in a water source. The solid $CaCO_3$ and $MgCO_3$ can be stored or used for other industrial purposes. In addition, the solid $CaCO_3$ and $MgCO_3$ are thermodynamically stable, resulting in almost permanent carbon abatement. Further, these salts can be used for different applications, for example, the formulation of drilling fluids.

The process of precipitating magnesium and calcium ions from produced water and subsequently utilizing the produced hydroxides to mineralize carbon dioxide has several advantages. First, the process softens the produced water.

Produced water is often unusable due to the high concentration of divalent ions. In contrast, softened produced water can be re-used in agriculture, drilling operations, fracturing operations, or other industrial processes. Accordingly, the process described herein creates a usable product (i.e., softened water) out of a waste product (i.e., produced brine). In addition, the produced hydroxides are used to sequester carbon dioxide via mineralization. This can be used to reduce the $CO_2$ output of industrial processes and therefore help mitigate excess atmospheric carbon. Therefore, the combination of precipitating divalent ions and using the resulting hydroxides for $CO_2$ mineralization has the two-fold, synergistic advantage of transforming a waste product into useable water as well as mitigating $CO_2$ output.

In addition, produced oilfield brines often include dissolved $H_2S$ and hydrocarbons. The addition of NaOH to a produced oilfield brine can remove both dissolved $H_2S$ and hydrocarbons. For example, increasing the pH of an oilfield brine can convert dissolved $H_2S$ to sulfides ($S^{2-}$). The sulfides can react with divalent ions in the produced oilfield brine and precipitate. In another example, dissolved oil reacts with NaOH in an in-situ saponification reaction, which generates carboxylate surfactants that will emulsify the hydrocarbons.

A method of treating produced oilfield brine according to the present disclosure includes adding sodium hydroxide to the produced oilfield brine to yield a first hydroxide treated brine. The first hydroxide treated brine can include up to 1.0 wt % NaOH. For example, the first hydroxide treated brine can include up to 1 wt %, up to 0.8 wt %, up to 0.7 wt %, up to 0.6 wt %, up to 0.5 wt %, up to 0.4 wt %, up to 0.3 wt %, up to 0.2 wt %, or up to 1.0 wt % NaOH. The first hydroxide treated brine can include a first slurry. The first slurry can include solid hydroxide precipitates. In some embodiments, the majority of the hydroxide precipitates are $Mg(OH)_2$ precipitates. For example, the hydroxide precipitates can be greater than 60% $Mg(OH)_2$ by weight, greater than 70% $Mg(OH)_2$ by weight, greater than 80% $Mg(OH)_2$ by weight, greater than 90% $Mg(OH)_2$ by weight, greater than 95% $Mg(OH)_2$ by weight, or greater than 99% $Mg(OH)_2$ by weight.

In the methods of the present disclosure, the first hydroxide treated brine is filtered extract $Mg(OH)_2$ precipitates. In some embodiments, the first hydroxide treated brine is filtered at an NaOH wt % of 1.0 wt % or less. For example, the brine can be filtered at 1.0 wt %, 0.8 wt %, 0.7 wt %, 0.6 wt %, 0.5 wt %, 0.4 wt %, 0.3 wt %, 0.2 wt %, or 0.1 wt % NaOH. After selectively extracting the $Mg(OH)_2$ precipitates, additional sodium hydroxide can be added to the filtered treated brine to yield a second hydroxide treated brine. The second hydroxide treated brine can include between 1.0 wt % and 3.5 wt % NaOH. For example, the second hydroxide treated brine can include 1.0 wt %, 1.5 wt %, 2.0 wt %, 2.5 wt %, 3.0 wt %, or 3.5 wt % NaOH. The second hydroxide treated brine includes a second slurry. The second slurry can include solid hydroxide precipitates. In some embodiments, the majority of the hydroxide precipitates are $Ca(OH)_2$ precipitates. For example, the hydroxide precipitates can be greater than 60% $Ca(OH)_2$ by weight, greater than 70% $Ca(OH)_2$ by weight, greater than 80% $Ca(OH)_2$ by weight, greater than 90% $Ca(OH)_2$ by weight, greater than 95% $Ca(OH)_2$ by weight, or greater than 99% $Ca(OH)_2$ by weight. The second hydroxide treated brine can be filtered to remove $Ca(OH)_2$ precipitates.

In some embodiments, drum filters are utilized to filter the first hydroxide and second hydroxide treated brines. In some embodiments, the NaOH is added to produced oilfield brine and/or the first hydroxide treated brine in a continuously stirred tank reactor (CSTR). The precipitation reactions as shown in Equations 1 and 2 are limited by molecular diffusion rather than kinetics, so continuous stirring can improve the efficiency of the process.

The method of the present disclosure includes utilizing the recovered $Mg(OH)_2$ and $Ca(OH)_2$ for carbon mineralization. For example, the recovered $Mg(OH)_2$ and $Ca(OH)_2$ can be used for carbon mineralization in a bubble column. A slurry is prepared that includes the recovered $Mg(OH)_2$ and/or $Ca(OH)_2$. The slurry is introduced to a pressurized bubble column containing $CO_2$, resulting in the precipitation of calcium and magnesium carbonates as shown in equations 3-6.

A system for extracting $Mg(OH)_2$ and $Ca(OH)_2$ from produced oilfield brine includes a series of continuously stirred tank reactors (CSTRs) and drum filters. The produced oilfield brine is introduced via a pipe to the first continuously stirred tank reactor. Sodium hydroxide is added to the produced oilfield brine in the first CSTR via a first hydroxide delivery pipe. The addition of NaOH to the produced water results in a first hydroxide treated brine. In some embodiments, the first hydroxide treated brine includes up to 1% by weight NaOH. The first hydroxide treated brine includes a first slurry. The first slurry includes solid hydroxide precipitates. In some embodiments, the majority of the hydroxide precipitates are $Mg(OH)_2$ precipitates. For example, the hydroxide precipitates can be greater than 60% $Mg(OH)_2$ by weight, greater than 70% $Mg(OH)_2$ by weight, greater than 80% $Mg(OH)_2$ by weight, greater than 90% $Mg(OH)_2$ by weight, greater than 95% $Mg(OH)_2$ by weight, or greater than 99% $Mg(OH)_2$ by weight. The first slurry is then flowed to a first drum filter via a first connecting pipe. The first connecting pipe connects the first CSTR and the first drum filter. In the first drum filter, the first hydroxide treated brine is filtered to remove the solid precipitates. The solid precipitates are removed from the first drum filter via a first precipitate outlet. Removing the solid precipitates yields a filtered treated brine. The filtered treated brine is flowed to a second CSTR via a second connecting pipe. An additional amount of sodium hydroxide is added to the filtered treated brine in the second CSTR. The addition of NaOH to the first filtered brine results in a second hydroxide treated brine. In some embodiments, the second hydroxide treated brine includes between about 1% and about 3.5% NaOH by weight. The second hydroxide brine includes a second slurry. The second slurry includes solid hydroxide precipitates. In some embodiments, the majority of the precipitates are $Ca(OH)_2$ precipitates. For example, the hydroxide precipitates can be greater than 60% $Ca(OH)_2$ by weight, greater than 70% $Ca(OH)_2$ by weight, greater than 80% $Ca(OH)_2$ by weight, greater than 90% $Ca(OH)_2$ by weight, greater than 95% $Ca(OH)_2$ by weight, or greater than 99% $Ca(OH)_2$ by weight. The second slurry is then flowed to a second drum filter via a second connecting pipe. The second connecting pipe connects the second CSTR and the second drum filter. In the second drum filter, the second hydroxide treated brine is filtered to remove the solid precipitates. The solid precipitates are removed from the second drum filter via a second precipitate outlet. Removing the solid precipitates yields a softened water. The softened water flows from the second drum filter via an outlet pipe.

Figure 2:
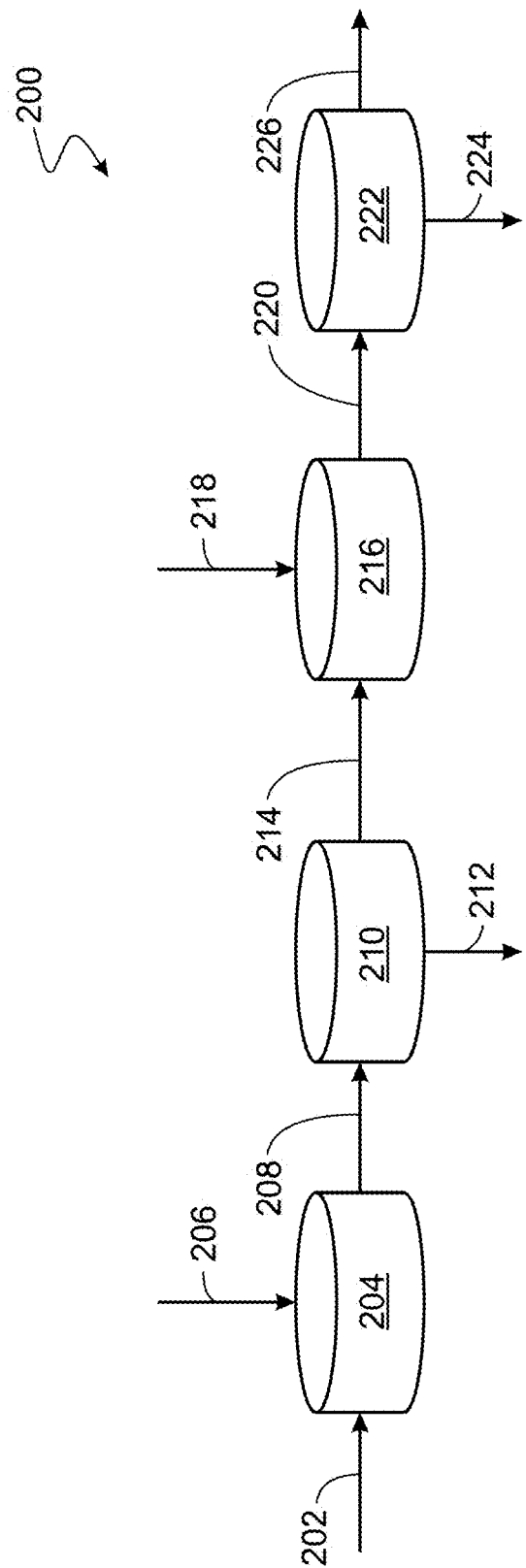
FIG. 2 shows a schematic of a system for precipitating and selectively recovering calcium and magnesium hydroxides.

FIG. 2 shows a schematic of a system 200 for precipitating and selectively recovering calcium and magnesium hydroxides. The system includes an inlet pipe 202. Produced oilfield brine is directed through the inlet pipe 202 to a first continuously stirred tank reactor (CSTR) 204. A first hydroxide delivery pipe 206 is fluidly connected to the first CSTR 204. The first hydroxide delivery pipe 206 is configured to deliver an amount of sodium hydroxide (NaOH) to the first CSTR. Addition of NaOH to the produced oilfield brine in the first CSTR results in a first hydroxide treated brine.

A first connecting pipe 208 is fluidly connected to the first CSTR 204 and to a first drum filter 210. The first connecting pipe is configured to deliver the first hydroxide treated brine to the first drum filter 210. The first drum filter 210 is configured to extract solid $Mg(OH)_2$ precipitates from the first hydroxide treated brine to yield a filtered treated brine. The solid $Mg(OH)_2$ precipitates are removed from the first drum filter 210 via a first precipitate outlet 212. The filtered treated brine is then directed to a second CSTR via a second connecting pipe 214.

A second hydroxide delivery pipe 218 is fluidly connected to the second CSTR 216. The second hydroxide delivery pipe 218 is configured to deliver an amount of sodium hydroxide to the second CSTR 216. Addition of NaOH to the filtered treated brine yields a second hydroxide treated brine.

A third connecting pipe 220 is fluidly connected to the second CSTR 216 and to a second drum filter 222. The third connecting pipe is configured to deliver the second hydroxide treated brine to the second drum filter 222. The second drum filter 222 is configured to extract solid $Ca(OH)_2$ from the second hydroxide treated brine to yield a softened water. The solid $Ca(OH)_2$ precipitates are removed from the second drum filter via a second precipitate outlet 224. The softened water is removed from the second drum filter 222 via an outlet pipe 226.

A method of producing hydroxides for use in carbon dioxide mineralization includes adding a first amount of sodium hydroxide to a produced oilfield brine to yield a first treated brine. In some embodiments, adding a first amount of NaOH to a produced oilfield brine includes adding a first amount of NaOH to a produced oilfield brine in a first continuously stirred tank reactor. In some embodiments, the first treated brine is less than 1% NaOH by weight. In some embodiments, the first treated brine includes a first slurry. The first slurry includes hydroxide precipitates. In some embodiments, the hydroxide precipitates in the first slurry are greater than 95% by weight $Mg(OH)_2$.

The method includes filtering the first treated brine to remove $Mg(OH)_2$ precipitates and yield a filtered treated brine. In some embodiments, filtering the $Mg(OH)_2$ precipitates from the first treated brine includes filtering the $Mg(OH)_2$ precipitates from the first treated brine using a first drum filter.

The method includes adding a second amount of NaOH to the filtered treated brine to yield a second treated brine. In some embodiments, adding a second amount of NaOH to the filtered treated brine includes adding a second amount of NaOH to the filtered treated brine in a second continuously stirred tank reactor. In some embodiments, the second treated brine is from about 1% to about 3.5% NaOH by weight. In some embodiments, the second treated brine includes a second slurry. The second slurry includes hydroxide precipitates. In some embodiments, the hydroxide precipitates in the second slurry are greater than 95% by weight $Ca(OH)_2$.

The method includes filtering the second treated brine to remove $Ca(OH)_2$ precipitates to yield a softened water. In some embodiments, filtering the $Ca(OH)_2$ precipitates from the second treated brine includes filtering the $Ca(OH)_2$ precipitates from the second treated brine using a second drum filter.

The method includes adding an amount of the filtered $Mg(OH)_2$, an amount of the filtered $Ca(OH)_2$, or an amount of the filtered $Mg(OH)_2$ and an amount of the filtered $Ca(OH)_2$ to a solution that includes aqueous carbon dioxide to yield carbonate precipitates. In some embodiments, the method includes recovering carbonate precipitates from the solution.

Figure 3:
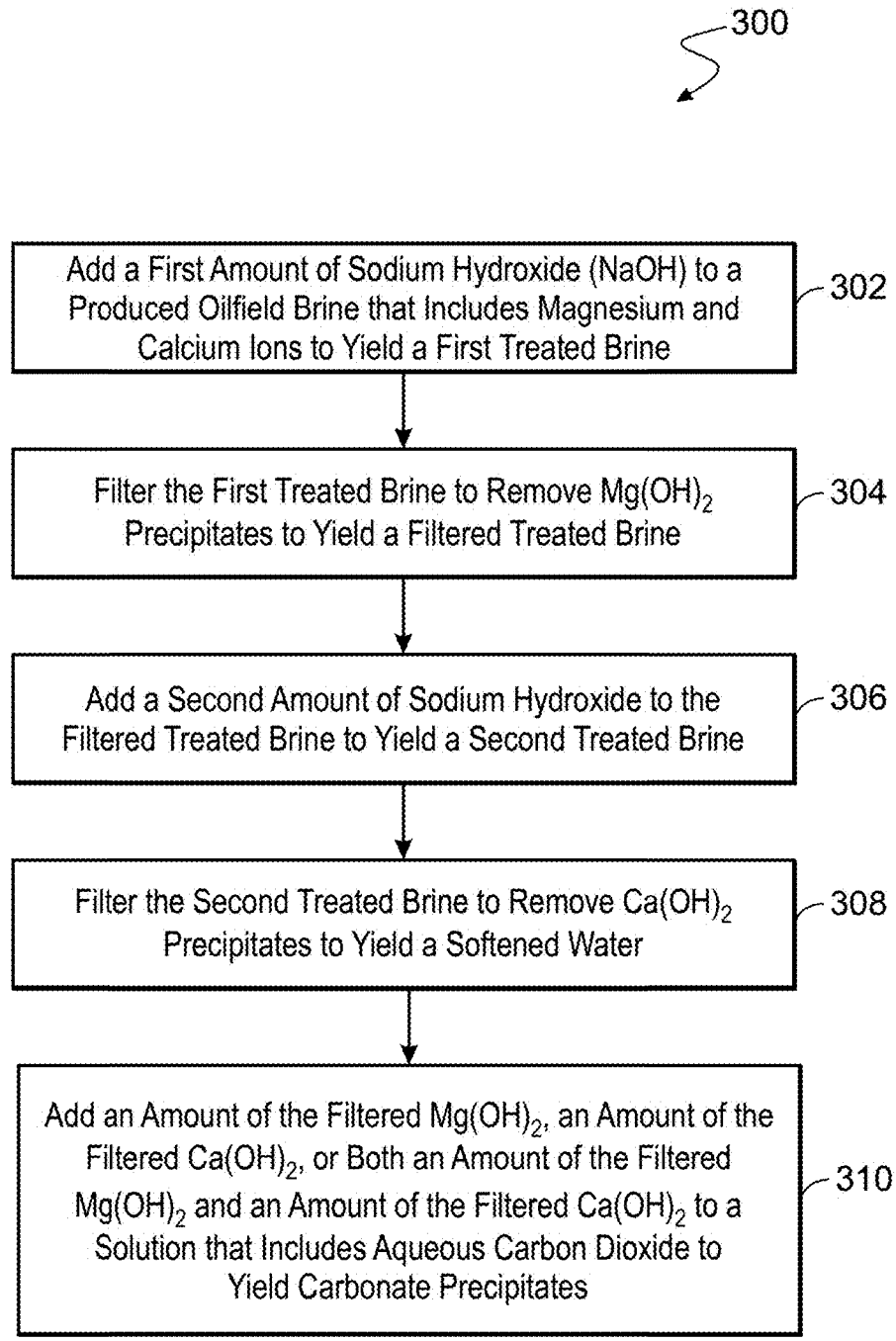
FIG. 3 is a flowchart of an example method of producing hydroxides for use in carbon dioxide mineralization.

FIG. 3 is a flowchart of an example method 300 of producing hydroxides for use in carbon dioxide mineralization. At 302, a first amount of sodium hydroxide (NaOH) is added to a produced oilfield brine that includes magnesium and calcium ions to yield a first treated brine. In some embodiments, adding a first amount of NaOH to a produced oilfield brine includes adding a first amount of NaOH to a produced oilfield brine in a first continuously stirred tank reactor. In some embodiments, the first treated brine is less than 1% NaOH by weight. In some embodiments, the first treated brine includes a first slurry. The first slurry includes hydroxide precipitates. In some embodiments, the hydroxide precipitates in the first slurry are greater than 95% by weight $Mg(OH)_2$. At 304, the first treated brine is filtered to remove $Mg(OH)_2$ precipitates and yield a filtered treated brine. In some embodiments, filtering the $Mg(OH)_2$ precipitates from the first treated brine includes filtering the $Mg(OH)_2$ precipitates from the first treated brine using a first drum filter. At 306, a second amount of NaOH is added to the filtered treated brine to yield a second treated brine. In some embodiments, adding a second amount of NaOH to the filtered treated brine includes adding a second amount of NaOH to the filtered treated brine in a second continuously stirred tank reactor. In some embodiments, the second treated brine is less than about 1% to about 3.5% NaOH by weight. In some embodiments, the second treated brine includes a second slurry. The second slurry includes hydroxide precipitates. In some embodiments, the hydroxide precipitates in the second slurry are greater than 95% by weight $Ca(OH)_2$. At 308, the second treated brine is filtered to remove $Ca(OH)_2$ precipitates to yield a softened water. In some embodiments, filtering the $Ca(OH)_2$ precipitates from the second treated brine includes filtering the $Ca(OH)_2$ precipitates from the second treated brine using a second drum filter. At 310, an amount of the filtered $Mg(OH)_2$, an amount of the filtered $Ca(OH)_2$, or an amount of the filtered $Mg(OH)_2$ and an amount of the filtered $Ca(OH)_2$ is added to a solution that includes aqueous carbon dioxide to yield carbonate precipitates. In some embodiments, the method includes recovering carbonate precipitates from the solution.

Definitions

The term "about" as used in this disclosure can allow for a degree of variability in a value or range, for example, within 10%, within 5%, or within 1% of a stated value or of a stated limit of a range.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

Embodiments

1. A method of producing hydroxides for use in carbon dioxide mineralization, the method comprising:
adding a first amount of sodium hydroxide (NaOH) to a produced oilfield brine, wherein the produced oilfield brine comprises magnesium and calcium ions, to yield a first treated brine, wherein the first treated brine comprises $Mg(OH)_2$ precipitates;
filtering the $Mg(OH)_2$ precipitates from the first treated brine to yield a filtered treated brine;
adding a second amount of NaOH to the filtered treated brine to yield a second treated brine, wherein the second treated brine comprises $Ca(OH)_2$ precipitates;
filtering the $Ca(OH)_2$ precipitates from the second treated brine to yield a softened water; and
adding an amount of the filtered $Mg(OH)_2$ precipitates, an amount of the filtered $Ca(OH)_2$ precipitates, or a combination thereof to a solution comprising aqueous carbon dioxide to yield carbonate precipitates.

2. The method of embodiment 1, wherein the first treated brine comprises less than 1% NaOH by weight.

3. The method of embodiment 1 or 2, wherein the second treated brine comprises less than about 1% to about 3.5% NaOH by weight.

4. The method of any one of embodiments 1-3, wherein the first treated brine comprises a first slurry, wherein:
the first slurry comprises hydroxide precipitates; and
the hydroxide precipitates comprise greater than 95% by weight $Mg(OH)_2$.

5. The method of any one of embodiments 1-4, wherein the second treated brine comprises a second slurry, wherein:
the second slurry comprises hydroxide precipitates; and
the hydroxide precipitates comprise greater than 95% by weight $Ca(OH)_2$.

6. The method of any one of embodiments 1-5, wherein filtering the $Mg(OH)_2$ precipitates from the first treated brine comprises filtering the $Mg(OH)_2$ precipitates from the first treated brine using a first drum filter.

7. The method of any one of embodiments 1-6, wherein filtering the $Ca(OH)_2$ precipitates from the second treated brine comprises filtering the $Ca(OH)_2$ precipitates from the second treated brine using a second drum filter.

8. The method of any one of embodiments 1-7, wherein adding a first amount of NaOH to a produced oilfield brine comprises adding a first amount of NaOH to a produced oilfield brine in a first continuously stirred tank reactor.

9. The method of any one of embodiments 1-8, wherein adding a second amount of NaOH to the filtered treated brine comprises adding a second amount of NaOH to the filtered treated brine in a second continuously stirred tank reactor.

10. The method of any one of embodiments 1-9, further comprising recovering carbonate precipitates from the solution.

What is claimed is:

1. A method of producing hydroxides for use in carbon dioxide mineralization, the method comprising:
adding a first amount of sodium hydroxide (NaOH) to a produced oilfield brine, wherein the produced oilfield brine comprises magnesium and calcium ions, to yield a first treated brine, wherein the first treated brine comprises $Mg(OH)_2$ precipitates and 0.1% to 1% NaOH by weight;
filtering the $Mg(OH)_2$ precipitates from the first treated brine to yield a filtered treated brine;
adding a second amount of NaOH to the filtered treated brine to yield a second treated brine, wherein the second treated brine comprises $Ca(OH)_2$ precipitates and 1.0% to 3.5% NaOH by weight;
filtering the $Ca(OH)_2$ precipitates from the second treated brine to yield a softened water; and
adding an amount of the filtered $Mg(OH)_2$ precipitates, an amount of the filtered $Ca(OH)_2$ precipitates, or a combination thereof to a solution comprising aqueous carbon dioxide to yield carbonate precipitates.

2. The method of claim 1, wherein the first treated brine comprises a first slurry, wherein:
the first slurry comprises hydroxide precipitates; and
the hydroxide precipitates comprise greater than 95% by weight $Mg(OH)_2$.

3. The method of claim 1, wherein the second treated brine comprises a second slurry, wherein:
the second slurry comprises hydroxide precipitates; and
the hydroxide precipitates comprise greater than 95% by weight $Ca(OH)_2$.

4. The method of claim 1, wherein filtering the $Mg(OH)_2$ precipitates from the first treated brine comprises filtering the $Mg(OH)_2$ precipitates from the first treated brine using a first drum filter.

5. The method of claim 1, wherein filtering the $Ca(OH)_2$ precipitates from the second treated brine comprises filtering the $Ca(OH)_2$ precipitates from the second treated brine using a second drum filter.

6. The method of claim 1, wherein adding the first amount of NaOH to the produced oilfield brine comprises adding the first amount of NaOH to the produced oilfield brine in a first continuously stirred tank reactor.

7. The method of claim 1, wherein adding the second amount of NaOH to the filtered treated brine comprises adding the second amount of NaOH to the filtered treated brine in a second continuously stirred tank reactor.

8. The method of claim 1, further comprising recovering carbonate precipitates from the solution.

* * * * *